US008848666B2

(12) United States Patent
Keller et al.

(10) Patent No.: US 8,848,666 B2
(45) Date of Patent: *Sep. 30, 2014

(54) HANDOVER OF EMERGENCY CALLS FROM A CIRCUIT SWITCHED TO A PACKET SWITCHED ACCESS NETWORK (75) Inventors: Ralf Keller, Wurselen (DE); Fredrik Lindholm, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 13 days.

This patent is subject to a terminal disclaimer.

(21) Appl. No.: 13/392,388

(22) PCT Filed: Jan. 27, 2012

(86) PCT No.: PCT/EP2012/051343
§ 371 (c)(1),
(2), (4) Date: Feb. 24, 2012

(87) PCT Pub. No.: WO2013/110347
PCT Pub. Date: Aug. 1, 2013

(65) Prior Publication Data
US 2013/0195076 A1    Aug. 1, 2013

(51) Int. Cl.
H04W 4/00    (2009.01)
(52) U.S. Cl.
USPC ......................................... 370/331
(58) Field of Classification Search
None
See application file for complete search history.

(56) References Cited

U.S. PATENT DOCUMENTS

| | | | |
|---|---|---|---|
| 2007/0149166 A1* | 6/2007 | Turcotte et al. | 455/404.1 |
| 2007/0254625 A1* | 11/2007 | Edge | 455/404.1 |
| 2008/0291874 A1* | 11/2008 | Bae et al. | 370/331 |
| 2009/0080382 A1* | 3/2009 | Chen et al. | 370/331 |
| 2009/0086674 A1 | 4/2009 | Ejzak | |
| 2009/0122793 A1* | 5/2009 | Yang | 370/352 |
| 2009/0232091 A1 | 9/2009 | Khan | |
| 2010/0034168 A1* | 2/2010 | Mahdi | 370/331 |
| 2010/0054209 A1* | 3/2010 | Mahdi | 370/331 |
| 2010/0074223 A1* | 3/2010 | Mahdi | 370/331 |
| 2010/0124897 A1* | 5/2010 | Edge | 455/404.1 |
| 2010/0202407 A1* | 8/2010 | Edge | 370/331 |
| 2010/0309847 A1 | 12/2010 | Bharadwaj | |
| 2010/0311386 A1* | 12/2010 | Edge et al. | 455/404.1 |

(Continued)

OTHER PUBLICATIONS

3GPP TR 23.826 for VCC Emergency Calls.*

(Continued)

*Primary Examiner* — Chirag Shah
*Assistant Examiner* — Jael Ulysse
(74) *Attorney, Agent, or Firm* — Myers Bigel Sibley & Sajovec, P.A.

(57) ABSTRACT

A method is provided of performing a handover with SRVCC to a target PS access network of an emergency call to a PSAP from a UE accessing a CS access network. The method includes sending a handover request from the CS access network towards an IMS network to transfer the emergency call. A CS to PS emergency handover command is sent to the UE, including an emergency STN identifying an access transfer control function. The UE sends a SIP INVITE to establish an emergency IMS session over the PS access network. The SIP INVITE includes the emergency STN so that the INVITE is routed to the access transfer control function. The emergency call sent over the CS access network with the emergency IMS session are correlated and the emergency call is switched to the emergency IMS session over the PS access network to complete the handover.

17 Claims, 6 Drawing Sheets (56) References Cited

U.S. PATENT DOCUMENTS

| | | | |
|---|---|---|---|
| 2011/0044327 | A1 | 2/2011 | Mahdi et al. |
| 2011/0141979 | A1* | 6/2011 | Keller et al. ............... 370/328 |
| 2011/0158121 | A1 | 6/2011 | Casati et al. |
| 2011/0165856 | A1* | 7/2011 | You et al. .................. 455/404.1 |
| 2011/0228707 | A1* | 9/2011 | Multikainen et al. ......... 370/259 |
| 2011/0230162 | A1* | 9/2011 | Mutikainen et al. ....... 455/404.1 |
| 2012/0044908 | A1* | 2/2012 | Spinelli et al. ............... 370/331 |
| 2012/0087339 | A1 | 4/2012 | Wu |
| 2013/0121334 | A1 | 5/2013 | Song et al. |
| 2013/0142168 | A1 | 6/2013 | Vedrine et al. |

OTHER PUBLICATIONS

International Search Report and Written Opinion of the International Searching Authority, International Application No. PCT/EP2012/051343, Oct. 10, 2012.

"3rd Generation Partnership Project; Technical Specification Group Services and System Aspects; Feasibility Study of Single Radio Voice Call Continuity (SRVCC) from UTRAN/GERAN to E-UTRAN/HSPA; Stage 2 (Release 11)", 3GPP Standard; 3GPP TR 23.885, 3rd Generation Partnership Project (3GPP), Mobile Competence Centre; 650, Route des Lucioles; F-06921 Sophia Antipolis Cedex; France, vol. SA WG2, No. V11.0.0, Sep. 23, 2011, pp. 1-83, XP050553882.

Change Request 23.216 CR 0235: 3GPP TSG-SA WG2 Meeting #88, S2-115354, 3rd Generation Partnership Project, "Introduction of SRVCC from CS to PS" (Release 11) Nov. 14-18, 2011 San Francisco, USA (27 pages).

Change Request 23.237 CR 0407: 3GPP TSG-SA WG2 Meeting #88, S2-115399, 3rd Generation Partnership Project, "Introduction of SRVCC from CS to PS" (Release 11) Nov. 14-18, 2011 San Francisco, USA (29 pages).

3GPP TS 23.167, "3rd Generation Partnership Project; Technical Specification Group Services and System Aspects; IP Multimedia Subsystem (IMS) emergency sessions, (Release 11)", V11.2.0 Sep. 2011 (41 pages).

3GPP TS 23.228, "3rd Generation Partnership Project; Technical Specification Group Services and System Aspects; IP Multimedia Subsystem (IMS); Stage 2, (Release 11)", V11.2.0 Sep. 2011 (274 pages).

International Search Report and Written Opinion of the International Searching Authority, PCT Application No. PCT/EP2012/051338, Oct. 9, 2012.

3GPP, "3rd Generation Partnership Project; Technical Specification Group Services and System Aspects; Single Radio Voice Call Continuity (SRVCC); Stage 2 (Release 11)", Draft_Interim_Version 23216-B30+, 3rd Generation Partnership Project (3GPP), Mobile Competence Centre; 650, Route des Lucioles; F-06921 Sophia-Antipolis Cedex; France, Jan. 26, 2012, XP050575054, 62 pp.

3GPP, "3rd Generation Partnership Project; Technical Specification Group Services and System Aspects; Single Radio Voice Call Continuity (SRVCC); Stage 2 (Release 11)", 3GPP Draft; 23216-B30_CRS_Implemented, 3rd Generation Partnership Project (3GPP), Mobile Competence Centre; 650, Route des Lucioles; F-06921 Sophia-Antipolis Cedex; France, Dec. 1, 2011, XP050575096, 58 pp.

3GPP TS 23.237 v11.2,0; "3rd Generation Partnership Project; Technical Specification Group Services and System Aspects; IP Multimedia Subsystem (IMS) Service Continuity"; Stage 2 (Release 11); Sep. 2011; 154 pages.

* cited by examiner

HANDOVER OF EMERGENCY CALLS FROM A CIRCUIT SWITCHED TO A PACKET SWITCHED ACCESS NETWORK

CROSS REFERENCE TO RELATED APPLICATION

This application is a 35 U.S.C. §371 national stage application of PCT International Application No. PCT/EP2012/051343, filed on 27 Jan. 2012, the disclosure and content of which is incorporated by reference herein in its entirety.

TECHNICAL FIELD

The present invention relates to methods and apparatus in a telecommunications network for enabling handover of an emergency call from a Circuit Switched (CS) to a Packet Switched (PS) access network. More particularly, the invention relates to handover of an emergency call with Single Radio Voice Call Continuity (SRVCC).

BACKGROUND

IP Multimedia services provide a dynamic combination of voice, video, messaging, data, etc, within the same session. This has lead to a growth in the numbers of basic applications and the media which it is possible to combine, leading to a growth in the number and variety of services offered to the end users—so-called "combinational IP Multimedia" services.

IP Multimedia Subsystem (IMS) is the technology defined by the Third Generation Partnership Project (3GPP) to provide IP Multimedia services over mobile communication networks. IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and application servers). Whilst SIP was created as a user-to-user protocol, IMS allows operators and service providers to control user access to services and to charge users accordingly. Other protocols are used for media transmission and control, such as Real-time Transport Protocol and Real-time Transport Control Protocol (RTP/RTCP).

Figure 1:
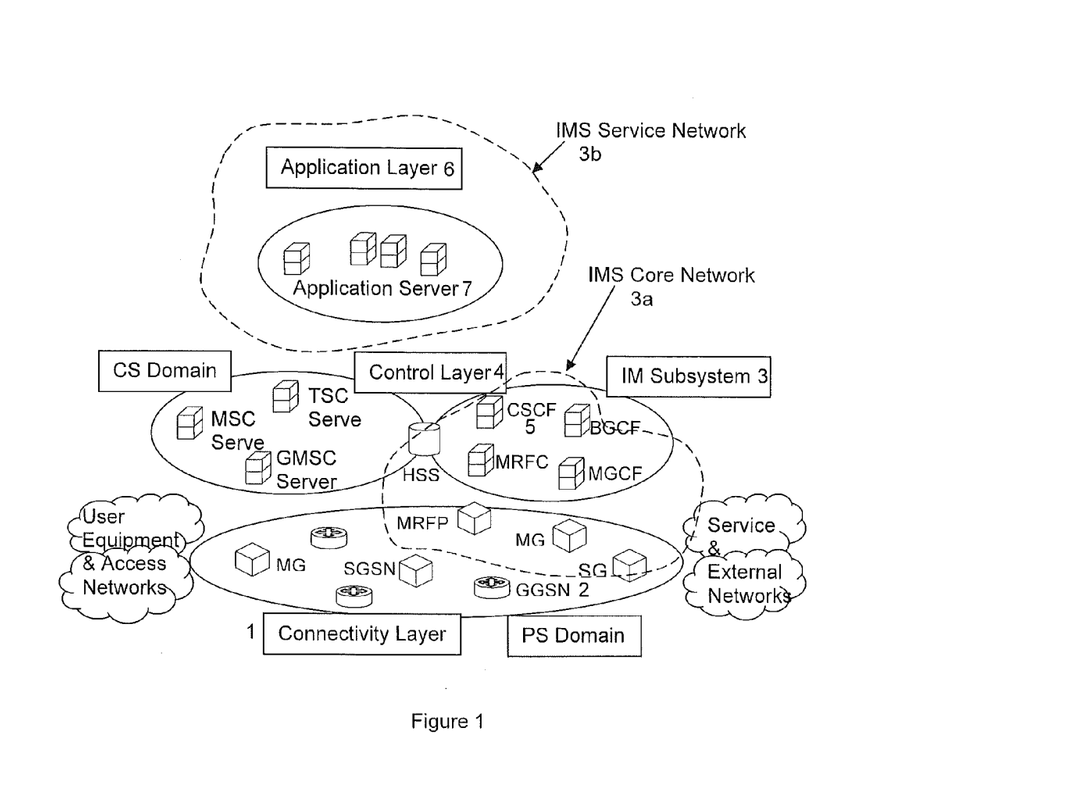
FIG. 1 illustrates schematically an IMS network in association with a mobile network architecture of a General Packet Radio Service (GPRS) access network.

FIG. 1 illustrates schematically how the IMS fits into the mobile network architecture in the case of a General Packet Radio Service (GPRS) access network. As shown in FIG. 1 control of communications occurs at three layers (or planes). The lowest layer is the Connectivity Layer 1, also referred to as the bearer plane and through which signals are directed to/from user equipment (UE) accessing the network. The entities within the connectivity layer 1 that connect an IMS subscriber to IMS services form a network that is referred to as the IP-Connectivity Access Network, IP-CAN. The GPRS network includes various GPRS Support Nodes (GSNs). A gateway GPRS support node (GGSN) 2 acts as an interface between the GPRS backbone network and other networks (radio network and the IMS network). The middle layer is the Control Layer 4, and at the top is the Application Layer 6.

The IMS 3 includes a core network 3a, which operates over the middle, Control Layer 4 and the Connectivity Layer 1, and a Service Network 3b. The IMS core network 3a includes nodes that send/receive signals to/from the GPRS network via the GGSN 2 at the Connectivity Layer 1 and network nodes that include Call/Session Control Functions (CSCFs) 5, which operate as SIP proxies within the IMS in the middle, Control Layer 4. The top, Application Layer 6 includes the IMS service network 3b. Application Servers (ASs) 7 are provided for implementing IMS service functionality.

Figure 2:
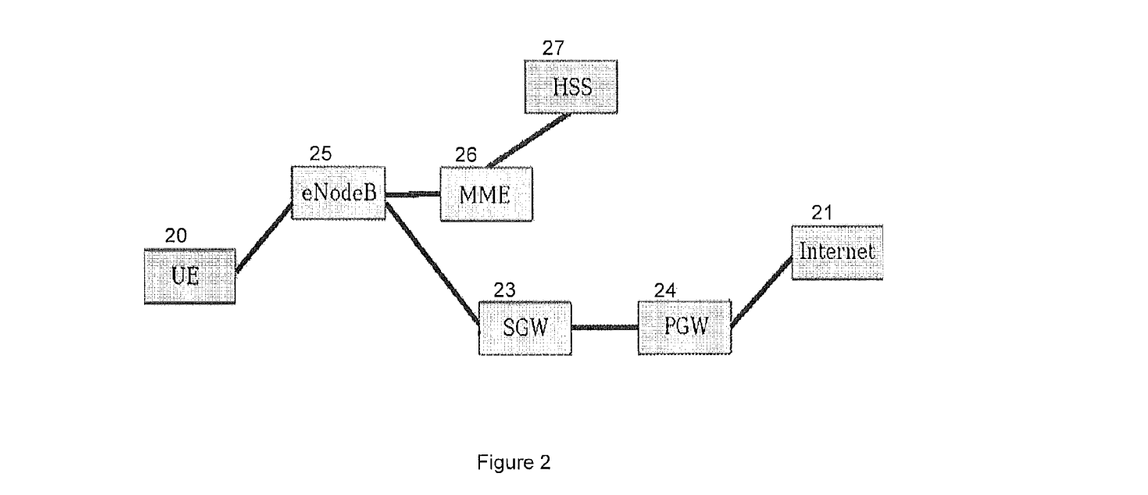
FIG. 2 illustrates schematically the components of a PS access network in accordance with the 3GPP defined Systems Architecture Evolution (SAE)

As shown in FIG. 1, User Equipment (UE) can access the IMS by attaching to an access network and then over the Connectivity Layer 1, which is part of a PS domain. In that case an IMS session can be set up by the UE using SIP signalling. FIG. 2 illustrates schematically the main components that are relevant to the present disclosure of a PS Evolved Packet Core (EPC) network in accordance with the 3GPP defined Systems Architecture Evolution (SAE), and shows a UE 20 accessing an IP network shown as the Internet 21. The principal network entities shown include a Serving Gateway (SGW) 23, a PDN Gateway (PGW) 24, an evolved NodeB (eNodeB) 25, a Mobility Management Entity (MME) 26 and the user's Home Subscriber Server (HSS) 27. For the purposes of the following discussion the SGW 23 and PGW 24 will be grouped together as one entity SGW/PGW.

Many existing access networks operate only using CS technology, but a UE may also access IMS services via a CS domain. Although the CS domain will not handle SIP, procedures are well established for dealing with the provision of media and services between the IMS and a UE using a CS access. There are many occasions when during a call/session it is required to transfer or hand over the call/session from one access network to another. There are a variety of factors that are used to determine when a call needs to be handed over to another access network, but these are not particularly relevant to the present discussion. All we need to know is that the CS access network determines, based on the cells for which the UE reports measurements, when the conditions arise that require a request to be made to the core network for the call to be handed over. Single Radio Voice Call Continuity (SRVCC) is described in 3GPP TS 23.237 and 3GPP TS 23.216, which specify procedures for handover of a voice call from a PS access to a CS access (e.g. transfer of a VoIP IMS session from an E-UTRAN to a UTRAN/GERAN). These technical specifications have also been extended to allow handover of a voice call from a CS access to a PS access.

However, the procedures specified for CS to PS handover with SRVCC do not specify any procedures for the transfer of an emergency call. As the emergency call in the CS domain has already been established to a particular destination Public Safety Access Point (PSAP), it is important to ensure that the emergency call towards the PSAP is not interrupted when the transfer to the PS domain occurs. This means that the PSAP must not be changed or impacted in a way that could interrupt the call. Once the routing of the emergency call to the PSAP has been set up, the handover procedures need to ensure that the mobility is hidden from the PSAP. Also, there may be special considerations for handling emergency calls that ensure the call is properly routed and not delayed or interrupted. Under the current procedures, the special considerations that are put in place for an emergency call in the CS domain may not be translated into corresponding considerations in the PS domain when the call is transferred. The transferred call could lose its emergency call status. This problem is addressed by the following discussion.

SUMMARY

A first aspect provides a method of performing a handover with SRVCC to a target PS access network of an emergency call to a PSAP from a UE accessing a CS access network. The method includes sending a handover request from the CS access network towards an IMS network to transfer the emergency call. A CS to PS emergency handover command is sent to the UE, including an emergency STN identifying an access transfer control function. The UE sends a SIP INVITE to establish an emergency IMS session over the PS access network. The SIP INVITE includes the emergency STN so that the INVITE is routed to the access transfer control function. The emergency call sent over the CS access network with the emergency IMS session are correlated and the emergency call is switched to the emergency IMS session over the PS access network to complete the handover.

A second aspect provides a network server configured for use as an access transfer control function in a telecommunications network. An emergency call from a UE accessing a CS access network is to be handed over with SRVCC to a target PS access network and thereby establish an emergency IMS session. The network server comprises an input/output for receiving and sending signals from/to the network and a processor. The processor is configured, on receiving a request from the CS access network, to provide an emergency STN to be sent to the UE identifying the network server as the access transfer function for the handover. On receiving a SIP INVITE from the UE to establish an emergency IMS session over the PS access network the network server correlates the emergency call over the CS access network with the emergency IMS session and switches the emergency call to the emergency IMS session over the PS access network to complete the handover.

A third aspect provides User Equipment configured to establish an emergency call in a CS access network, and for the call to be handed over with SRVCC to a target PS access network, thereby to establish an emergency IMS session. The User Equipment includes an input/output for receiving and transmitting signals via the CS access network and for receiving and transmitting signals via a PS access network, a memory storing data and program instructions and a processor. The processor is configured to process the program instructions, and on receiving a handover command from the CS access network together with an emergency STN, to generate and send a SIP INVITE including the emergency STN to the IMS network to establish the emergency IMS session.

DETAILED DESCRIPTION

Figure 3:
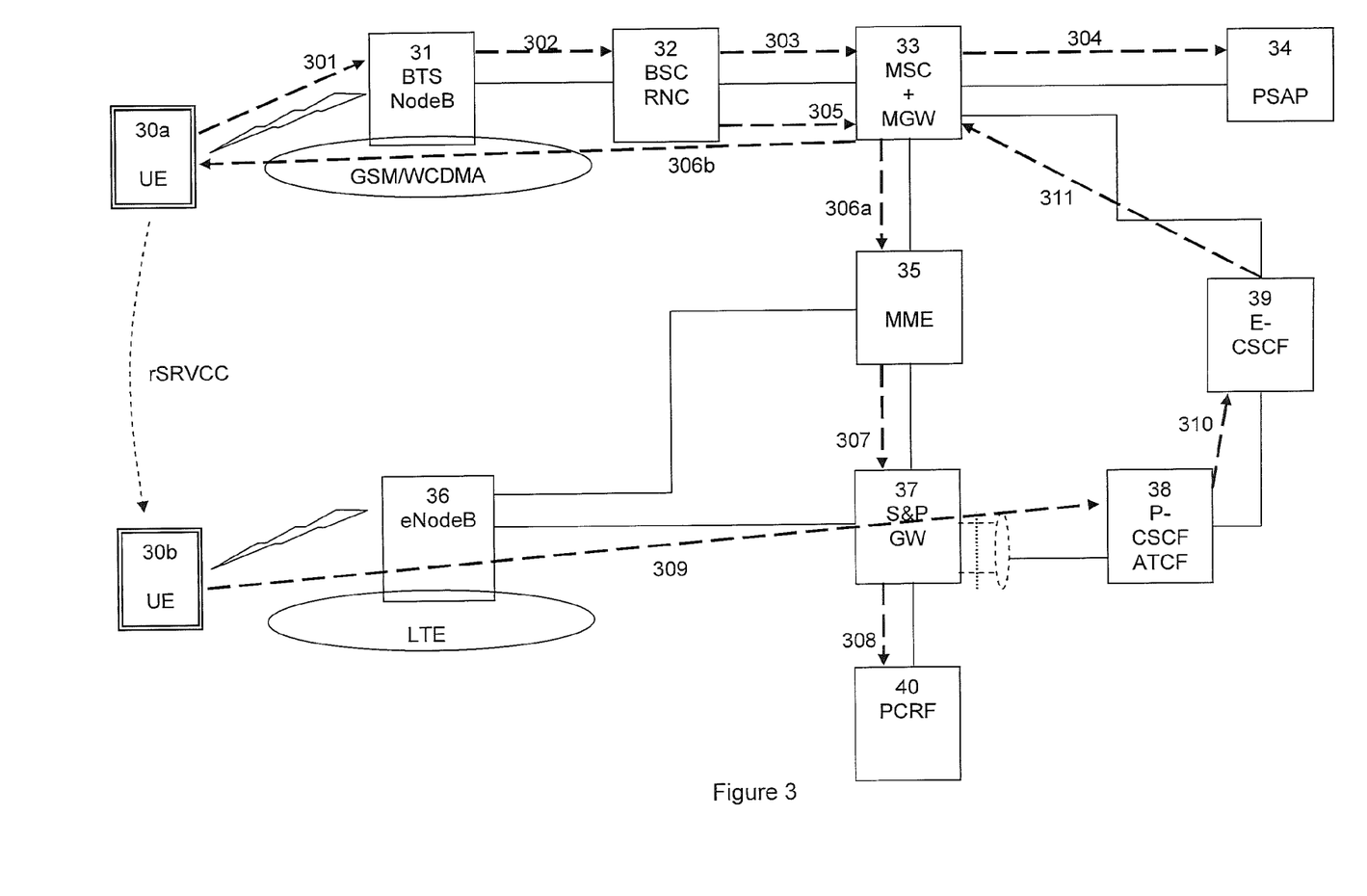
FIG. 3 illustrates schematically the interactions between network components involved in a handover of an emergency call from a CS access to a PS access with SRVCC in accordance with one embodiment.
Figure 4:
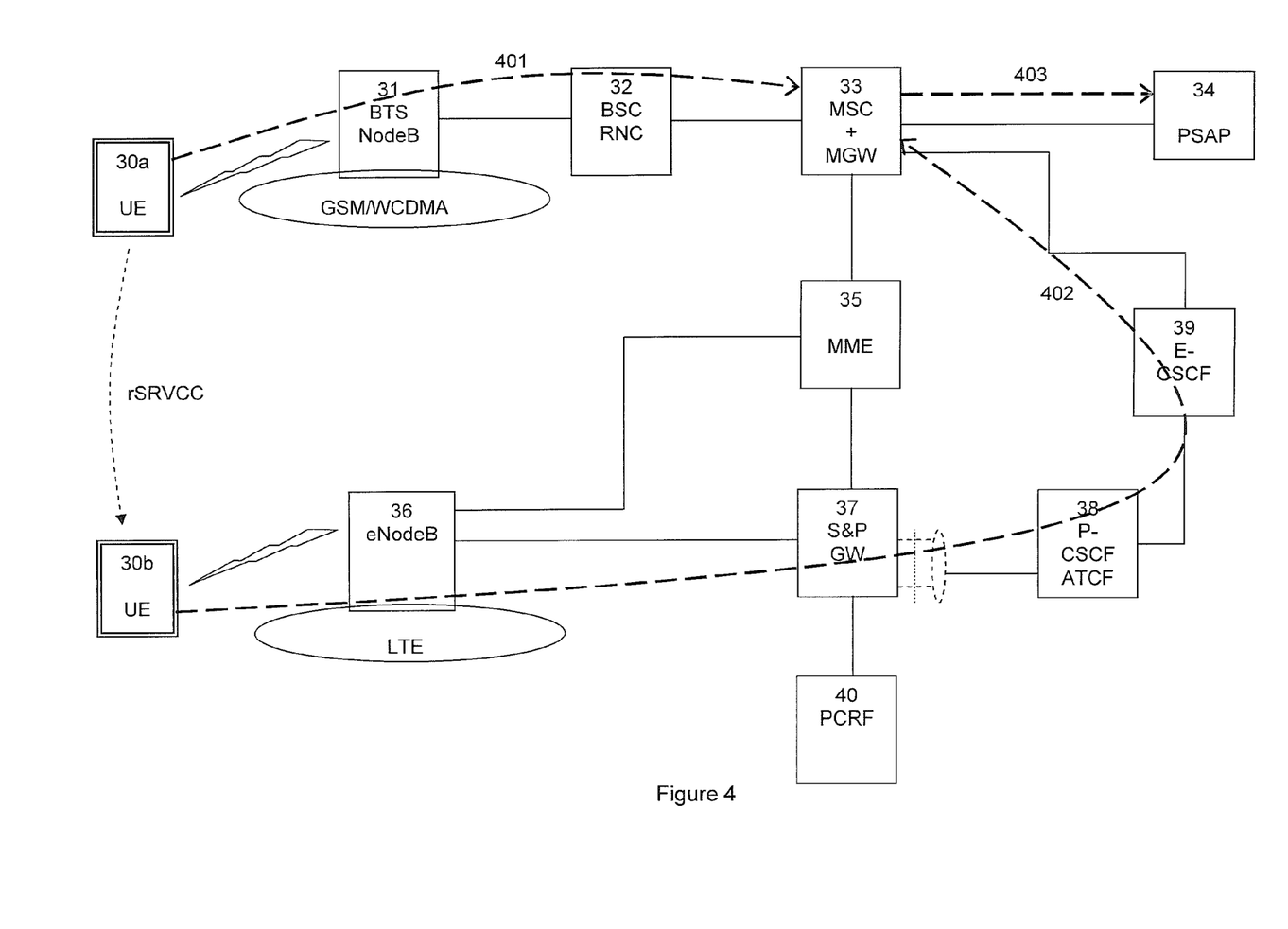
FIG. 4 illustrates schematically the paths of the media bearers between network components of an emergency call before and after the handover for the embodiment of FIG. 3.

FIGS. 3 and 4 illustrate schematically a first embodiment for handover of an emergency call from a CS access network (GSM/WCDMA—Wideband Code Division Multiple Access) to a PS access network (LTE) with SRVCC. This embodiment describes the case where a UE 30 initiates a TS12 emergency call (as specified in 3GPP TS 22.003 version 10.0.0) over the CS access network, and the call is routed in the CS domain to a Public Safety Access Point (PSAP) 34. Note that the UE 30 is capable of accessing both a CS and a PS access network and has corresponding interfaces for each type of access. FIGS. 3 and 4 show the UE 30 in two positions: UE 30a using its CS access capability before the handover and UE 30b using its PS capability after the handover, but this is the same device and will be referred to generally as UE 30. The network entities shown for the CS access include a BTS NodeB 31 and a Base Station Controller/Radio Network Controller (BSC/RNC) 32. The call is anchored in the CS domain such that, both before and after handover, it is routed to the PSAP 34 via a Mobile Switching Centre (MSC) Server and Media Gateway (MGW) 33. In other words, the MGW controlled by the MSC Server 33 is used as the anchor point during the handover of the emergency call.

The network entities shown for the PS (LTE) access include an MME 35, eNodeB 36, and a S&PGW 37. In addition the IMS network entities shown include a Proxy CSCF (P-CSCF) 38, an Emergency CSCF (E-CSCF) 39 and a Policy and Charging Rules Function (PCRF) 40. the P-CSCF 38 also acts as the Access Transfer Control Function for the handover procedure.

The principal features of this embodiment are as follows:
The UE 30a is attached to the CS access network, and registered in the IMS. The MSC Server 33 replaces the MSISDN (Mobile Subscriber Integrated Services Digital Network Number) that it received for CS usage from the Home Location Register (HLR—not shown), with the MSISDN it received from the IMS during the registration procedures as the calling party identity before forwarding the emergency call to the PSAP 34. This ensures that call back from the PSAP 34 will work as it is possible that the MSISDN received from the HLR cannot be used to reach the UE 30, for example if it is barred.

To speed up the procedures and to avoid the situation where the UE 30 has to create a new emergency Public Data Network (PDN) for the handover, an optional network-initiated procedure may be used to establish the necessary resources in the target PS access network and IMS entities.

Registration in the IMS for the emergency call is also omitted as it would take too much time, and instead an unauthenticated IMS emergency procedure is used to avoid delay during the handover. Note that the emergency call has already been allowed in the CS domain. To ensure that the handed over emergency call is set up by the same user, an optional authentication token is included in a handover (HO) Command sent from the MSC Server 33 to the UE 30, so that the UE 30 can include it when it sends a SIP INVITE to the target PS access network.

A new Emergency Session Transfer Number (STN) for CS to PS is introduced so that in the IMS the call can be routed back to the MSC Server 33 and is not considered to be a new emergency call.

FIG. 3 illustrates schematically the routing of signals between the network components for this embodiment.

Signals 301-304 are the original emergency call setup over the CS access network from the UE 30a to the PSAP 34 (using standard TS12 procedures). With the user attached to the CS access network and registered in the IMS from the MSC Server 33, when the MSC Server 33 receives the call signal 303, it replaces the CS MSISDN with the IMS MSISDN as the calling party identity before forwarding the emergency call 304 to the PSAP 34.

Signal 305 is sent from the BSC/RNC 32 to the MSC Server 33 to indicate that a handover of the emergency call is required, which triggers the rSRVCC emergency procedures (as specified in TS 23.216). Signal 306a is a CS to PS HO emergency request sent from the MSC Server 33 to the MME 35. If the emergency call from the UE 30a has not been authenticated, the MSC Server 33 indicates that in the request 306a, and also includes the International Mobile Equipment Identity (IMEI) of the UE 30. The IMEI may also be included if the call has been authenticated. The MME 35 then performs the allocation of any required resources for the emergency call session in the PS domain (LTE access and IMS). At the same time, the MSC Server 33 sends the CS to PS emergency HO command 306b to the UE 30a, together with the IP address and ports for the MGW, the Emergency STN for CS to PS, and optionally also the authentication/correlation token. This information may either be included in the HO command message or in a separate message sent prior to the HO command.

In signals 307-308, the PCRF 40 is informed of the emergency handover from the MME 35, via the S&PGW. At this stage the PCRF 40 can optionally pre-establish a network-initiated emergency Access Point Name, APN, and any relevant emergency bearers.

In signal 309, the UE 30b (using its PS interface) establishes an emergency PDN if required (i.e. if the optional network-initiated procedure referred to above is not active), and sends an unauthenticated INVITE to the IMS (without first doing an emergency registration), including the Emergency STN for CS to PS and the optional authentication/correlation token. In signals 310 and 311, the INVITE is routed through the IMS, via the E-CSCF 39, to the MSC Server 33 based on the Emergency STN for CS to PS. The MSC Server 33 correlates two sessions (CS emergency call and IMS emergency session) and switches the control to the new access. The MSC Sever 33 may use the authentication/correlation token to make sure that the sessions belong to the same user and that the correct session is being transferred.

FIG. 4 shows the same network entities as FIG. 3, and the paths over which media data is sent between the UE 30a and the PSAP 34 before the handover and between the UE 30b and the PSAP 34 after the handover. Path 401 is the path between the UE 30a and the MSC server 33 over the CS access network before handover. Path 402 is between the UE 30b and the MSC Server 33 after the handover and path 403 is between the MSC Server 33 and the PSAP both before and after handover.

Figure 5:
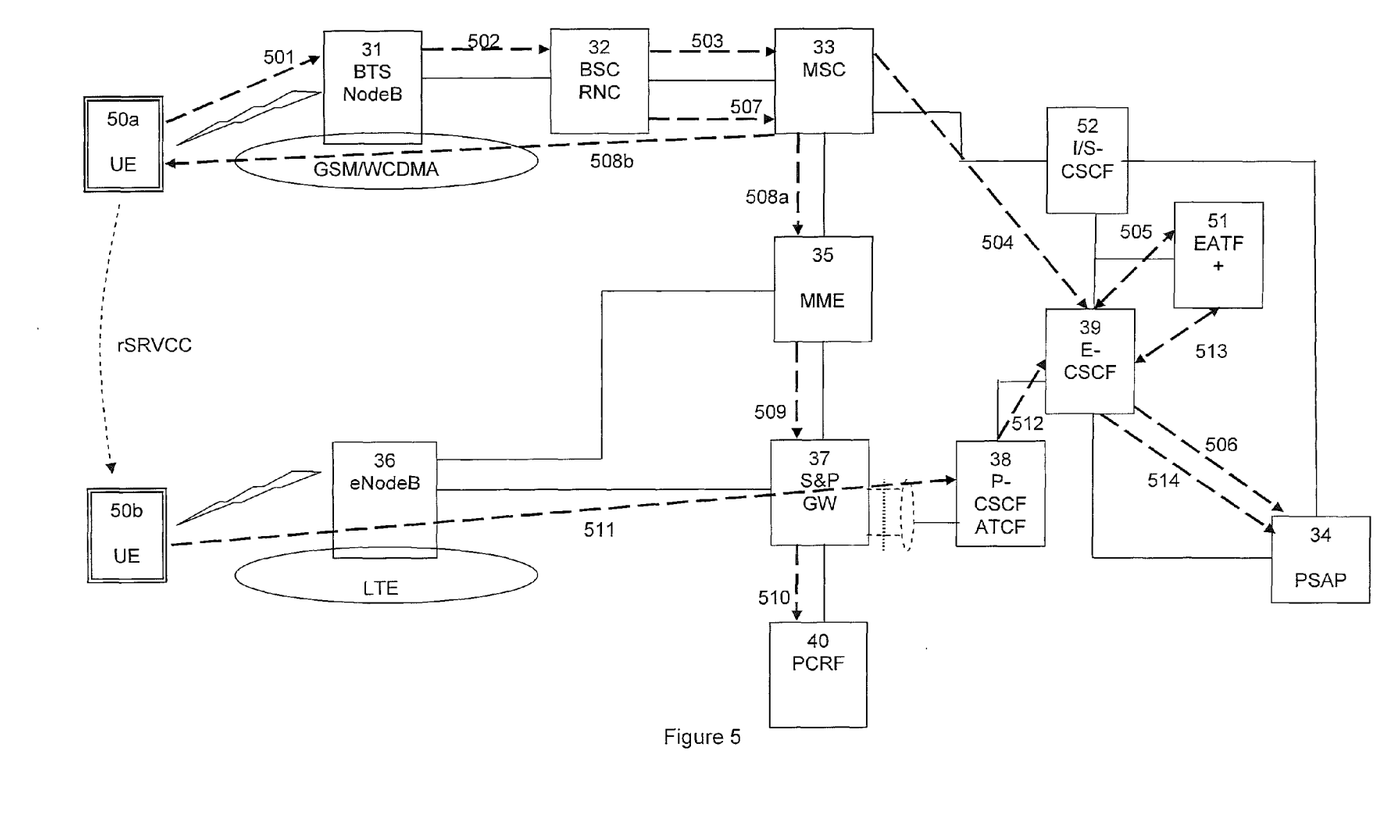
FIG. 5 illustrates schematically the interactions between network components involved in a handover of an emergency call from a CS access to a PS access with SRVCC in accordance with another embodiment.

FIG. 5 illustrates schematically the interactions between network components involved in a handover of an emergency call from a CS access network (GSM/WCDMA) to a PS access network (LTE) with SRVCC in accordance with a second embodiment. In this embodiment, a UE 50 initiates a TS12 emergency call over the CS access network, but the call is routed to the PSAP 34 via the IMS. As in the first embodiment described above, the UE 50 is capable of accessing both a CS and a PS access network and has corresponding interfaces for each type of access. FIG. 5 shows the UE 50 in two positions: UE 50a using its CS access capability before the handover and UE 50b using its PS capability after the handover. The network entities shown for the CS access and for the PS access are the same as shown in FIGS. 3 and 4 and have the same reference numerals. In addition, the following IMS network entities are shown: an Emergency Access Transfer Function (EATF) 51, a CSCF 52 (shown as either or both of an Interrogating CSCF, I-CSCF, and a Serving CSCF, S-CSCF).

The emergency call starts with an ordinary TS12 emergency call over the CS access network to the MSC Server. Instead of routing the emergency call in the CS domain, the MSC Server sends the emergency call over the IMS, via the E-CSCF 39 and EATF 51, so that the emergency call is anchored in the IMS. As with the first embodiment described above, with the UE 50 already attached to the CS access network, and registered in the IMS from the MSC Server 33, then the MSC Server 33 replaces the MSISDN it has received for CS usage with the MSISDN received from the IMS during registration as the calling party identity, before forwarding the emergency call to the PSAP 34.

In this case, the MSC Server 33 obtains an Emergency STN for CS to PS of the EATF 51 during the call setup, and provides this to the UE 50 (e.g. by including it in the HO command to the UE 50). The EATF may also include an authentication/correlation token. The INVITE from the UE 50 to set up the emergency session is sent using the Emergency STN for CS to PS to the EATF.

Also as in the first embodiment, to speed up the procedures and to avoid the situation where the UE 30 has to create a new emergency PDN for the handover, an optional network-initiated procedure may be used to establish the necessary resources in the target PS access network and IMS entities.

Again, the IMS emergency registration is omitted, and the unauthenticated IMS emergency procedure is used to avoid delay during the transfer. The EATF 51 may check the authentication/correlation token sent by the UE 50 during the transfer.

Referring to FIG. 5, signals 501-506 are the emergency call setup over the CS access network, and then routed through the IMS to the PSAP 34. Thus, signals 501 to 503 are the same as in FIG. 3, while in signal 504 the emergency call is forwarded from the MSC Server 33 to the E-CSCF 39. As before, with the user attached to the CS network, and registered in the IMS from the MSC Server 33, the MSC Server replaces the MSISDN it received for CS usage, with the MSISDN received from the IMS during the registration procedures as the calling party identity before forwarding the emergency call towards the PSAP 34. Signals 505 are an exchange between the E-CSCF 39 and the EATF 51, as part of which the EATF sends its Emergency STN and, optionally, an authentication/correlation token back to the MSC Server 33.

Signal 507 is sent from the BSC RNC 32 to the MSC Server 33 to indicate that a handover of the emergency call is required, which triggers the rSRVCC emergency procedures (as specified in TS 23.216). Signal 508a is a CS to PS HO emergency request is sent from the MSC Server 33 to the MME 35. If the emergency call from the UE 50a has not been authenticated, the MSC Server 33 indicates that in the request 508a, and also includes the International Mobile Equipment Identity (IMEI) of the UE 50. The IMEI may also be included if the call has been authenticated. The MME 35 then performs the allocation of any required resources for the emergency call session in the PS domain (LTE access and IMS). At the same time, the MSC Server 33 sends the CS to PS emergency HO command 508b to the UE 50a, together with the Emergency STN for CS to PS, and optionally also the authentication/correlation token. This information may either be included in the HO command message or in a separate message sent prior to the HO command.

In signals 509 and 510, the PCRF 40 is informed of the emergency handover from the MME 35, via the S&PGW. At this stage the PCRF 40 can optionally pre-establish a network-initiated emergency APN and any relevant emergency bearers.

In signal 511, the UE 50b (using its PS interface) establishes an emergency PDN if required (i.e. if the optional network-initiated procedure referred to above is not active), and sends an unauthenticated INVITE to the IMS (without first doing an emergency registration), including the Emergency STN for CS to PS and the optional authentication/correlation token.

In signals 512-514, the INVITE is routed via the E-CSCF 39 and the EATF 51, based on the Emergency STN for CS to PS, and on to the PSAP 34. The EATF 51 correlates the two sessions (CS emergency call and IMS emergency session) and switches the control to the new PS access. The EATF 51 may use the authentication/correlation token to make sure that the sessions belong to the same user and that the correct session being transferred.

Figure 6:
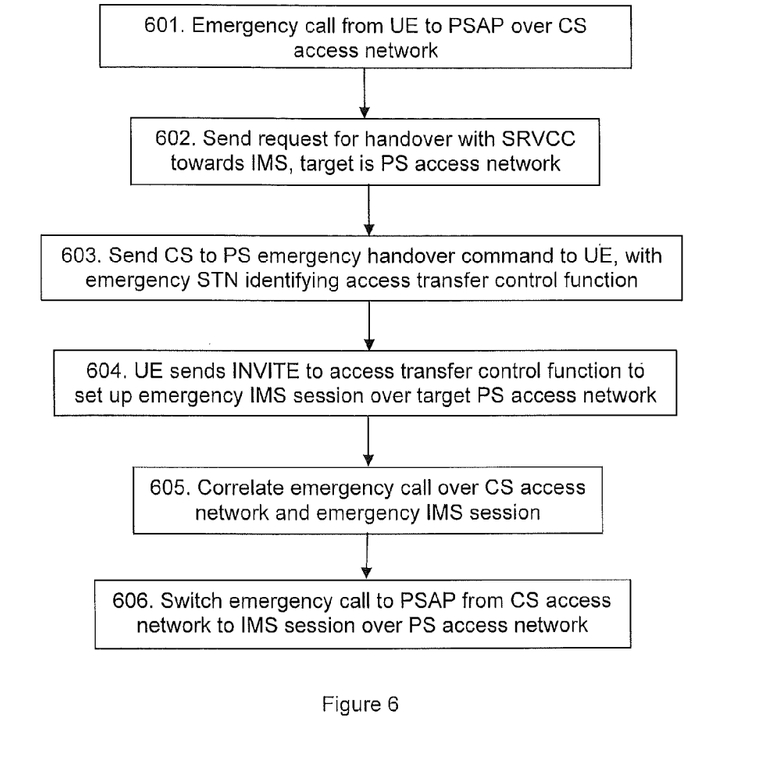
FIG. 6 is a flow diagram illustrating the principal method steps in a method of CS to PS handover with SRVCC of an emergency call.

FIG. 6 is a flow diagram illustrating the principal method steps in a method of CS to PS handover with SRVCC of an emergency call, as described above. At step 601 an emergency call is made from a UE to a PSAP over a CS access network. As described for each of the first and second embodiments above, the call may be routed to the PSAP in the CS domain, or via the IMS. At step 602 a request for handover with SRVCC is sent towards the IMS, with the target access network for the handover being a PS access network. In step 603 a CS to PS emergency handover command is sent to the UE. The UE is also provided with an emergency STN identifying the access transfer control function for the handover (e.g. MSC Server or EATF). At step 604, the UE then sends an INVITE to the access transfer control function (based on the emergency STN) to set up an emergency IMS session between the UE and the PSAP over the target PS access network. At step 605, the EATF correlates the two sessions —i.e. the original emergency call over the CS access network and the new emergency IMS session, and at step 606 switches the emergency call from the CS access network to the IMS session over the PS access network.

Figure 7:
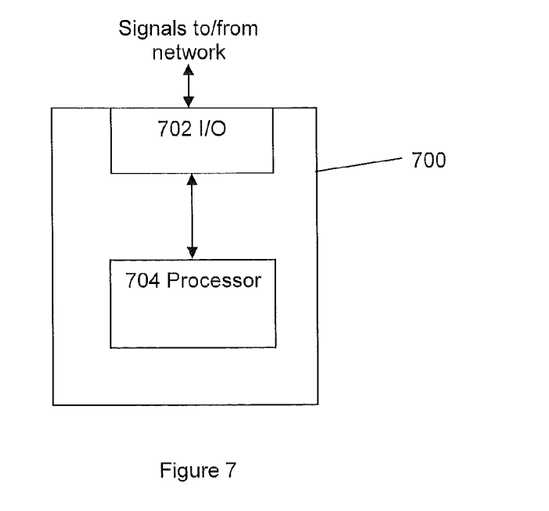
FIG. 7 is a schematic block diagram of a network server.

FIG. 7 is a schematic block diagram of a network server 700, configured for use as an access transfer control function in which an emergency call to a PSAP from a UE over a CS access network can be handed over to a PS access network. The network server 700 includes an input/output 702 for receiving and sending signals from/to the network and a processor 704. The processor 704 is configured such that, on receiving a handover request for the emergency call from the CS access network, an emergency STN is provided, which is sent to the UE identifying the network server as the access transfer function for the handover. On receiving a SIP INVITE from the UE over the PS access network, establishing an emergency IMS session, the network server 700 correlates the emergency call over the CS access network with the emergency IMS session, and switches the emergency call to the emergency IMS session over the PS access network to complete the handover.

Figure 8:
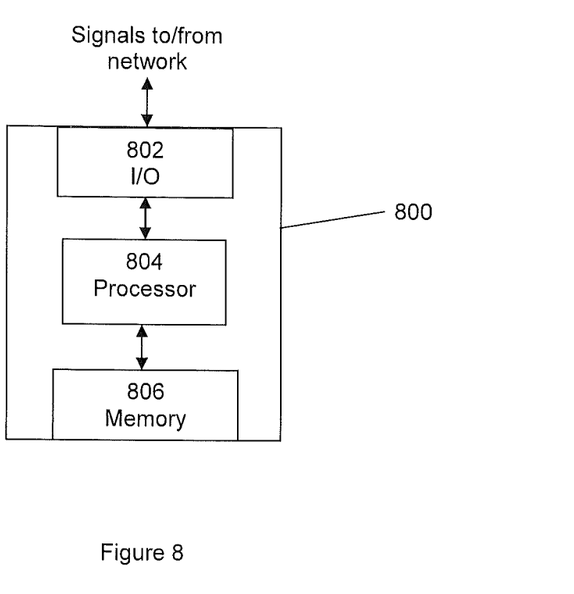
FIG. 8 is a schematic block diagram of a UE.

FIG. 8 is a schematic block diagram of a UE 800, configured to establish an emergency call in a CS access network, and for the call to be handed over with SRVCC to a target PS access network, thereby to establish an emergency IMS session. The UE includes an input/output 802 for receiving and transmitting signals via the CS access network and for receiving and transmitting signals via a PS access network. A memory 806 stores data and program instructions. A processor 804 is configured to process the program instructions, and on receiving a handover command from the CS access network together with an emergency STN, to generate and send a SIP INVITE, which includes the emergency STN, to the IMS network to establish the emergency IMS session.

The procedures and associated apparatus described above have numerous advantages in allowing a CS emergency call to be transferred to a PS based priority call (over IMS) in accordance with the other procedures set out for SRVCC in the 3GPP specifications. In particular, the use of an Emergency STN for CS to PS enables the UE to find the correct access transfer control function for the handover. For authenticated cases, the MSC Server uses a non-barred identity received at IMS registration as its calling party number for the emergency call (instead of the MSISDN the MSC Server received from the HLR). This guarantees that a call back through the IMS will reach it. Further security is provided through the use of the described authentication/correlation token, which can also be distributed throughout the network. The procedures also allow for a network created emergency PDN/APN. An unregistered/un-authenticated call over the IMS can be correlated with the previous CS emergency call. New emergency indication procedures from the MSC through the MME, to the PGW/PCRF, and use of IMEI as an identifier instead of the IMS Identifier allow handover of emergency calls from UEs in operating in a limited service mode.

The invention claimed is:

1. A method of performing a handover with Single Radio Voice Call Continuity (SRVCC) to a target Packet Switched (PS) access network of an emergency call to a Public safety Access Point (PSAP) from a User Equipment (UE) accessing a Circuit Switched (CS) access network, the method comprising:

sending a handover request from the CS access network towards an IP Multimedia Subsystem (IMS) network to transfer the emergency call;

sending a CS to PS emergency handover command to the UE, including an authentication token and an emergency Session Transfer Number (STN) identifying an access transfer control function;

the UE sending a Session Initiation Protocol (SIP) INVITE to establish an emergency IMS session over the PS access network, wherein the SIP INVITE includes the authentication token and the emergency STN so that the INVITE is routed to the access transfer control function, wherein an unauthenticated IMS emergency procedure is used to set up the emergency IMS session over the PS access network in response to the CS to PS emergency handover;

sending a CS to PS emergency handover request to a Mobile Management Entity (MME), the MME allocating resources for the emergency IMS session, wherein an International Mobile Equipment Identity (IMEI) of the UE is included in the CS to PS emergency handover request only in response to the IMS emergency procedure being unauthenticated;

operating the MME to inform a Policy and Charging Rules Function (PCRF) of the CS to PS emergency handover request;

operating the PCRF to establish an emergency APN and associated emergency bearers;

correlating the emergency call sent over the CS access network with the emergency IMS session; and switching the emergency call to the emergency IMS session over the PS access network to complete the handover.

2. The method of claim 1, wherein the Mobile Subscriber Integrated Services Digital Network Number (MSISDN) provided for use in calls over the CS access network for the UE is replaced by an MSISDN provided for use in IMS sessions prior to forwarding the emergency call to the PSAP.

3. The method of claim 1, further comprising providing the authentication token to the UE by including it in the emergency handover command, or in a separate message sent prior to the emergency handover command.

4. The method of claim 1, further comprising establishing by the UE an emergency Public Data Network (PDN) connection in response to the CS to PS emergency handover.

5. The method of claim 1, further comprising routing the emergency call over the CS network to the PSAP.

6. The method of claim 5, wherein the CS to PS emergency handover command includes IP addresses and port identifiers of a Media Gateway (MGW) through which the emergency call will be routed using the PS access network.

7. The method of claim 6, further comprising:
anchoring the emergency call in the CS access network at the MGW which is controlled by a Mobile Switching Centre (MSC) server acting as the access transfer control function, and
routing the SIP INVITE to the MSC server in response to the emergency STN.

8. The method of claim 7, further comprising by the MSC server:
correlating the CS emergency call and the emergency IMS session; and
transferring control of the call from the CS access network to the IMS session in response to the correlation.

9. The method of claim 1, further comprising routing the emergency call via the IMS to the PSAP.

10. The method of claim 9, wherein the emergency STN included in the CS to PS emergency handover command identifies an Emergency Access Transfer Function (EATF) in the IMS network as the access transfer control function.

11. The method of claim 10, further comprising by the EATF:
correlating the CS emergency call and the emergency IMS session; and
transferring control of the call from the CS access network to the IMS session in response to the correlation.

12. A network server configured for use as an access transfer control function in a telecommunications network wherein an emergency call from a User Equipment (UE) accessing a Circuit Switched (CS) access network is to be handed over with Single Radio Voice Call Continuity (SRVCC) to a target Packet Switched (PS) access network and thereby establish an emergency IP Multimedia Subsystem (IMS) session, the network server comprising:
an input/output circuit configured for receiving and sending signals from/to the network; and a processor configured:
in response to receiving a request from the CS access network, to provide an authentication token and an emergency Session Transfer Number (STN) to be sent to the UE identifying the network server as the access transfer function for the handover;
in response to receiving an unauthenticated Session Initiation Protocol (SIP) INVITE from the UE, to establish an emergency IMS session over the PS access network without IMS registration of the emergency call;
to send a CS to PS emergency handover request to a Mobile Management Entity (MME), the MME allocating resources for the emergency IMS session, wherein an International Mobile Equipment Identity (IMEI) of the UE is included in the CS to PS emergency handover request only in response to the IMS emergency procedure being unauthenticated, wherein the MME is operated to inform a Policy and Charging Rules Function (PCRF) of the CS to PS emergency handover request, and wherein the PCRF is operated to establish an emergency APN and associated emergency bearers;
to correlate the emergency call over the CS access network with the emergency IMS session;
to determine that the emergency call and the emergency IMS session both belong to the UE using the authentication token received in the SIP INVITE from the UE; and
to switch the emergency call to the emergency IMS session over the PS access network to complete the handover in response to the correlation.

13. The network server of claim 12, wherein the network server is part of a Mobile Switching Centre (MSC) server.

14. The network server of claim 12, wherein the network server is part of an Emergency Access Transfer Function (EATF) in the IMS network.

15. User Equipment configured to establish an emergency call in a Circuit Switched (CS) access network, and for the call to be handed over with Single Radio Voice Call Continuity (SRVCC) to a target Packet Switched (PS) access network, thereby to establish an emergency IMS session, the User Equipment comprising:
an input/output circuit configured for receiving and transmitting signals via the CS access network and for receiving and transmitting signals via a PS access network;
a memory configured for storing data and program instructions; and
a processor configured to process the program instructions, and in response to receiving a handover command from the CS access network together with an emergency Session Transfer Number (STN) and an authentication token to generate and send a Session Initiation Protocol (SIP) INVITE including the emergency STN and the authentication token to the IMS network to establish the emergency IMS session, wherein a CS to PS emergency handover request is made to a Mobile Management Entity (MME), the MME allocating resources for the emergency IMS session, wherein an International Mobile Equipment Identity (IMEI) of the UE is included in the CS to PS emergency handover request only in response to the IMS emergency procedure being unauthenticated, wherein the MME is operated to inform a Policy and Charging Rules Function (PCRF) of the CS to PS emergency handover request, and wherein the PCRF is operated to establish an emergency APN and associated emergency bearers.

16. A computer program in a non-transitory memory and configured to be executed by a processor of the computer to cause the computer in a network to perform hand over with Single Radio Voice Call Continuity (SRVCC) to a target Packet Switched (PS) access network, an emergency call to a Public safety Access Point (PSAP)-from a User Equipment (UE) accessing a Circuit Switched (CS) access network, the computer program is further configured to perform the hand over including by:
sending a handover request from the CS access network towards an IP Multimedia Subsystem (IMS) network to transfer the emergency call;
sending a CS to PS emergency handover command to the UE, including an authentication token and an emergency Session Transfer Number (STN) identifying an access transfer control function;

in response to the UE sending a Session Initiation Protocol (SIP) INVITE, to establish an emergency IMS session over the PS access network, wherein the SIP INVITE includes the authentication token and the emergency STN so that the INVITE is routed to the access transfer control function, correlating the emergency call sent over the CS access network with the emergency IMS session, wherein an unauthenticated IMS emergency procedure is used to set up the emergency IMS session over the PS access network in response to the CS to PS emergency handover;

sending a CS to PS emergency handover request to a Mobile Management Entity (MME), the MME allocating resources for the emergency IMS session, wherein an International Mobile Equipment Identity (IMEI) of the UE is included in the CS to PS emergency handover request only in response to the IMS emergency procedure being unauthenticated, wherein the MME is operated to inform a Policy and Charging Rules Function (PCRF) of the CS to PS emergency handover request, and wherein the PCRF is operated to establish an emergency APN and associated emergency bearers; and switching the emergency call to the emergency IMS session over the PS access network to complete the handover.

17. A computer program product comprising instructions in a non-transitory memory and configured to be executed by a processor of the computer to cause the computer in a network to perform hand over with Single Radio Voice Call Continuity (SRVCC) to a target Packet Switched (PS) access network, an emergency call to a Public safety Access Point (PSAP) from a User Equipment (UE) accessing a Circuit Switched (CS) access network, the instructions are further configured to perform the hand over including by:

sending a handover request from the CS access network towards an IP Multimedia Subsystem (IMS) network to transfer the emergency call;

sending a CS to PS emergency handover command to the UE, including an authentication token and an emergency Session Transfer Number (STN) identifying an access transfer control function;

in response to the UE sending a Session Initiation Protocol (SIP) INVITE to establish an emergency IMS session over the PS access network, wherein the SIP INVITE includes the authentication token and the emergency STN so that the INVITE is routed to the access transfer control function, correlating the emergency call sent over the CS access network with the emergency IMS session, wherein an unauthenticated IMS emergency procedure is used to set up the emergency IMS session over the PS access network in response to the CS to PS emergency handover;

sending a CS to PS emergency handover request to a Mobile Management Entity (MME), the MME allocating resources for the emergency IMS session, wherein an International Mobile Equipment Identity (IMEI) of the UE is included in the CS to PS emergency handover request only in response to the IMS emergency procedure being unauthenticated;

operating the MME to inform a Policy and Charging Rules Function (PCRF) of the CS to PS emergency handover request;

operating the PCRF to establish an emergency APN and associated emergency bearers; and switching the emergency call to the emergency IMS session over the PS access network to complete the handover.

* * * * *